United States Patent [19]
Touchette et al.

[11] Patent Number: 6,073,862
[45] Date of Patent: Jun. 13, 2000

[54] GASEOUS AND LIQUID FUEL INJECTOR

[75] Inventors: Alain Michel Joseph Touchette; Bradley Donald Douville, both of Vancouver; Simon Michael Baker, Richmond, all of Canada

[73] Assignee: Westport Research Inc., Vancouver, Canada

[21] Appl. No.: 09/154,103

[22] Filed: Sep. 16, 1998

[51] Int. Cl.$^7$ ..................................................... B05B 7/12
[52] U.S. Cl. ............................................. 239/408; 239/96
[58] Field of Search .............................. 239/96, 408–410; 123/27 GE, 526, 299, 300

[56] References Cited

U.S. PATENT DOCUMENTS

| | | |
|---|---|---|
| 2,173,813 | 9/1939 | Bischof . |
| 2,696,807 | 12/1954 | Junge et al. . |
| 3,747,857 | 7/1973 | Fenne . |
| 4,033,301 | 7/1977 | Walton . |
| 4,187,825 | 2/1980 | Lloyd, Jr. . |
| 4,691,674 | 9/1987 | Otsuka et al. . |
| 4,693,227 | 9/1987 | Satou . |
| 4,711,209 | 12/1987 | Henkel . |
| 4,856,713 | 8/1989 | Burnett ..................................... 239/409 |
| 4,958,605 | 9/1990 | O'Neal et al. . |
| 5,365,902 | 11/1994 | Hsu . |

FOREIGN PATENT DOCUMENTS

| | | |
|---|---|---|
| 1284687 | 12/1968 | Germany . |
| 603024 | 6/1948 | United Kingdom . |

*Primary Examiner*—Charles R. Eloshway
*Attorney, Agent, or Firm*—McAndrews, Held & Malloy, Ltd.

[57] ABSTRACT

A hydraulically actuated dual fuel injector for an internal combustion engine. More particularly, the application pertains to a hydraulically actuated injector for injecting controlled quantities of a first fuel and of a second fuel into an internal combustion diesel engine at different times. A dual fuel injector comprising: (a) an injector body; (b) an inlet port in the injector body for enabling pressurized hydraulic fluid from a hydraulic fluid source to be introduced into the interior of the injector body, the hydraulic fluid being of sufficient pressure to maintain injection valves in the injector body in a closed position until actuated; (c) a first inlet port in the injector body for enabling a first fuel to be introduced into the interior of the injector body; (d) a first injection valve in the injector body connected to the second inlet port for controlling injection of the first fuel from the injector through a first fuel ejection port; (e) a second inlet port in the injector body for enabling a second fuel to be introduced into the interior of the injector body; (f) a second injection valve in the injector body connected to the second inlet port for controlling injection of the second fuel from the injector through a second fuel ejection port; (g) a first control valve which causes the hydraulic fluid to actuate the first injection valve; (h) a second control valve which causes the hydraulic fluid to actuate the second injection valve; (i) a metering device in the injector body for metering the amount of first fuel injected by the first injection valve; and (j) a seal in the injector body which prevents leakage of the second fuel into the first fuel.

26 Claims, 7 Drawing Sheets

GASEOUS AND LIQUID FUEL INJECTOR

FIELD OF THE INVENTION

This invention relates to a novel hydraulically actuated dual fuel injector for an internal combustion engine. More particularly, the application pertains to a hydraulically actuated injector for injecting controlled quantities of a first fuel and a second fuel into an internal combustion diesel engine at different times.

BACKGROUND OF THE INVENTION

Because of its ready availability, low cost and potential for reducing particulate emissions, natural gas is a promising candidate for fuelling diesel engines. Methods that can be used to convert a diesel engine (a compression-ignition engine) to consume natural gas fall into three categories. One is to convert the engine to a stoichiometric or lean-burn spark-ignition engine. As a second option, the engine can be converted to natural gas using a "dual-fuel" technology, in which the natural gas is mixed with all of or with a portion of the intake air and is ignited by diesel fuel injected at the end of the compression stroke. A third method is the direct injection of the natural gas fuel in the combustion chamber, with a source of ignition. The preferred method, as discussed below, is the direct injection method because it is the only method which preserves the inherent favourable operating characteristics and high efficiency of diesel engines.

(1) Fuelling Diesel Engines with Premixed Air and Natural Gas—Spark-Ignition A diesel engine can be converted to natural gas by injecting the natural gas with the intake air and allowing the mixture to enter the chamber through the intake valve. The mixture, stoichiometric or lean, can then be ignited near top dead center using spark plugs. However, to avoid detonation of the mixture, the compression ratio of the engine must be reduced. A reduction in compression ratio is accompanied by a reduction in efficiency, or equivalently by an increase in fuel consumption. Furthermore, to maintain the strength of the mixture under all conditions, the intake air must be throttled, causing pumping losses and further increasing the fuel consumption required to maintain equivalent power. These losses are especially pronounced at low or part load levels, which are the predominant operating conditions of automotive engines. Typically, the conversion of diesel engines to stoichiometric or lean-burn combustion of natural gas with spark plug ignition offers a considerable reduction in harmful emissions, but also leads to an increase in fuel consumption.

(2) Fuelling Diesel Engines with Premixed Air and Natural Gas—Pilot Ignition In this method, the natural gas is generally admitted in the intake air and enters the combustion chamber through the intake ports or valve. The mixture is ignited near top-dead center by the injection of pilot diesel fuel. There are, however, fundamental complications with this method:

1. At low load, with unthrottled diesel operation, the gas fuel and air mixture is too lean for satisfactory combustion. The fuel consumption increases under these conditions and the hydrocarbon emissions also increase. Remedies to this situation include:
   a. Reverting to diesel fuel operation at low loads—in some applications where substantial part load conditions exist this remedy defies the purpose of the fuel substitution.
   b. Throttling of the intake air, which is complicated when the engine is equipped with turbochargers because of the danger of compressor surge (although with modern electronic-controlled wastegates this may be avoidable). In any case, such throttling removes an inherent advantage of diesel operation.
   c. Skip-firing, which consists of not firing the cylinders at each cycle but rather at every other cycle. This method does not usually permit smooth engine operation, particularly on 4 cylinder engines, and is usually too unstable for idling, requiring straight diesel operation.

2. Because a premixed fuel-air mixture exists during the compression, there is a danger of knocking (an uncontrolled combustion of the mixture), with potential engine damage. Thus, reduction in compression ratio may be required. If a reduction in compression ratio is chosen, the engine efficiency is compromised. If the compression ratio is maintained, the amount of natural gas used under each condition must be limited such that the mixture formed is not prone to knocking. This means that more diesel fuel must be used to sustain high load cases.

This pilot ignition method and the previously discussed spark ignition method are not well suited for 2-stroke engines because a substantial amount of the intake charge flows out the exhaust valve in two-cycle engines and is wasted. To avoid this bypass, and to improve on the low load combustion characteristics, it has been proposed to inject the natural gas directly in the combustion chamber after all valves or ports are closed, but still at a relatively low pressure. This adds difficulty because a new injection system control is needed, modifications to the head or block are required, and metering the gaseous fuel and ensuring stratification is difficult.

So far as is known, this second method has been proven capable of maintaining the efficiency over a wide range of load and speeds only by retaining a substantial amount of diesel fuel to compensate for the above problems.

(3) Direct Injection of Natural Gas into Diesel Engine Cylinders

The great advantage of direct injection of fuel into the engine cylinders in diesel operation is that it permits efficient and stable burning over the whole load range. This is because the burning occurs in local regions in which the fuel-air ratio is within the prescribed flammability limits. Natural gas has the advantage over diesel fuel in that it does not require atomization into micron-size droplets and thus does not require very high injection pressures. For diesel injection, pressures as high as 1000 atm are required for most efficient operation. For natural gas, pressures of 200 atm are satisfactory. The principal difficulty with the direct injection of natural gas is that the gas will not self-ignite, as diesel fuel does, at the typical temperature and pressure range of a diesel engine. To overcome this difficulty, another source of ignition must be provided. Examples of ignition sources are some small quantity of self-igniting pilot diesel fuel injected with or separate from the natural gas, glow plugs or hot surfaces, and the like. For economical reasons, it is desirable to limit the modifications necessary to the engine. In that respect, an ignition source that can be injected through a unique injector with the natural gas or other gaseous fuel is an advantage.

REVIEW OF PRIOR ART

Successful operation of large bore diesels with direct injection of compressed natural gas has been demonstrated in North America, as discussed in the following publications:

1. J. F. Wakenell, G. B. O'Neal, and Q. A. Baker, "High Pressure Late Cycle Direct Injection of Natural Gas in a Rail Medium Speed Diesel Engine", SAE Technical Paper 872041;
2. Willi, M. L., Richards, B. G., "Design and Development of a Direct Injected, Glow Plug Ignition Assisted, Natural Gas Engine", ICE-Vol. 22, Heavy Duty Engines: A look at the Future, ASME 1994; and
3. Meyers, D. P., Bourn G. D., Hedrick, J. C., Kubesh, J. T., "Evaluation of Six Natural Gas Systems for LNG Locomotive Applications", SAE Technical Paper 972967.

Meyers et al at the Southwest Research Institute demonstrated the superiority of the direct injection of natural gas over other means of fuelling a locomotive engine with natural gas. The direct injection of natural gas led to the best thermal efficiency for the targeted reduction of nitrogen oxide emissions. They used two injectors to accomplish the injection of the two fuels. The gas injector was hydraulically actuated and electronically controlled and was mounted at an angle in the combustion chamber. The original diesel fuel injector was used with however smaller holes to reduce the amount of diesel pilot fuel injected.

The work by Wakenell et al, carried out at Southwest Research Institute, involved direct injection of natural gas into a large bore (8.5") 2-stroke, locomotive diesel engine. The natural gas was stored in liquid form (LNG), then pumped to high pressures of 5000 psi (340 atm). Full rated power was achieved with less than 2% pilot diesel fuel (98% natural gas) and thermal efficiency was slightly lower than 100% diesel operation. The gas injector valve replaced the diesel injector and a small diesel injector was installed in the "test-cock" hole in the cylinder head. The gas injector was a hydraulically actuated gas injector, with the high-pressure being supplied by an independent hydraulic pump.

Willi and Richards at Caterpillar demonstrated the possibility of using glow plugs to ignite the directly injected natural gas in a diesel engine. The results indicated equal or better thermal efficiency and nitrogen oxide emissions and reduced particulate matter. The injector used for this application is a modified HEUI injector from Caterpillar (which is the object of SAE papers 930270 and 930271 and inferentially in U.S. Pat. Nos. 5,181,494 and 5,191,867 and 5,245,970 and 5,143,291). The injector, designed for gas injection only, contains a mechanism to shape the injection rate of the gaseous injection. Pressurized oil is supplied from a common pump, and is intensified within the injector. There appears to be no means for injecting a pilot fuel.

The following Norwegian publications disclose injection of gaseous fuel in diesel engines:
1. Einang, P. M., Korea, S., Kvamsdal, R., Hansen, T., and Sarsten, A., "High-Pressure, Digitally Controlled Injection of Gaseous Fuel in a Diesel Engine, with Special Reference to Boil-Off from LNG Tankers", Proceedings CIMAC Conf., June 1983;
2. Einang, P. M, Engja, H., Vestergren, R., "Medium Speed 4-stroke Diesel Engine Using High Pressure Gas Injection Technology", Proceedings CIMAC Conf., 1987.

Einang et al. [1983], in Norway, conducted tests involving the direct injection of natural gas into a 2-stroke marine diesel engine through a separate gas injector, the original diesel fuel injector being used for pilot ignition. With 73% natural gas proportion, the thermal efficiency of the natural gas fuelled engine was slightly better than diesel fuelling. The NOx emissions were reduced by some 24%. No details of the gas injector were released. The subsequent work [1987] involved the direct injection of natural gas with pilot diesel fuel in a four-stroke engine. A combined gas/oil injection valve was used, but no details of that injector are disclosed in the publication.

In Finland, the following publication is of interest:
1. Verstergren, R., "The Merits of the Gas-Diesel Engine", ASME ICE-Vol. 25-3, 1995.

Dual fuel injectors are not detailed in the discussion, but appear in a number of publications and patents as discussed later.

From Japan and Denmark, the following publications are of interest:
1. Miyake, M., Endo, Y., Biwa, T., Mizuhara, S., Grone, O., Pedersen, P. S., "Recent Development of Gas Injection Diesel Engines", CIMAC Conf., Warsaw, 1987;
2. Biwa, T., Beppu, O., Pedersen, P. S., Grone, O., Schnohr, O., Fogh, M., "Development of the 28/32 Gas Injection Engine", MAN B&W;
3. Miyake, M., Biwa, T., Endoh, Y., Shimotsu, M., Murakami, S., Komoda, T., "The Development of High Output, Highly Efficient Gas Burning Diesel Engines", 15th CIMAC Conference, Paris, 1983, Proceedings, vol. A2, pp. 1193–1216;
4. Fukuda, T., Komoda, T., Furushima, K., Yanagihara, M., Ito, Y., "Development of the Highly Efficient Gas Injection Diesel Engine with Glow Plug Ignition Assist for Cogeneration Systems", JSME-ASME International conference in Power Engineering, ICOPE-93.

The Japanese work of Miyake et al. (Mitsui Engineering and Shipb. Co.) showed good results, with equivalent engine efficiency at 85% of engine load using 5% pilot diesel fuel in a large diesel engine (420 mm bore). Two injection systems are presented; the first one is the utilization of 2 separate injectors. In that instance, a gas injector design is discussed and is based on a hydraulically actuated needle. The source of hydraulic actuation is an engine driven actuator-pump. A single injector design capable of injecting both the pilot diesel fuel and the natural gas is also presented. The injector is also actuated by an external source of pressurized oil, and is based on concentric needles. Also, the design is not well suited for smaller diesel engines, as the needle seats are not at the tip of the injector. This means that a substantial amount of fuel remains in the injector and can be injected late in the expansion stroke. This situation is not very important in an engine with high fuel consumption, but it leads to increased pollutant emissions and loss of efficiency in a smaller engine operating from idle to rated speed.

The same Japanese authors presented further refinements and tests in 1987. A new combined injector was presented based on two separate needle valves located upstream from the injector tip, one controlling the pilot diesel fuel and one controlling the natural gas. As mentioned above, this design is not well suited for smaller size engines, because of the amount of fuel trapped between the needle valve and the injector tip, resulting in late injection. Also, it is difficult to provide fine atomization of the pilot diesel fuel with a needle valve located away from the tip.

The Mitsui Engineering team also tested a system using direct injection of natural gas only with glow plug ignition. In this case, a gas injection valve was used, but the schematic diagram reveals little information about the needle valve which is actuated by high-pressure oil supplied by an external pump.

The work of the Japanese and Danish team on the 28/32 Engine (MAN B&W Diesel and Mitsui) also featured a single injector capable of handling pilot diesel fuel and natural gas fuel. This time, the design was based on two separate needle valves located upstream from the nozzle. The design featured high-pressure oil as a means of sealing the high-pressure natural gas. The 28/32 engine is a fairly large bore (280 mm) engine used for generators and in marine applications. The actuating oil was also supplied from an independent pump. The injector design includes a needle valve well upstream of the nozzle which is not suitable for smaller engines as explained previously.

Injectors for injecting fuel into the combustion chamber of an internal combustion engine have been known for many years. A number of patents disclose fuel injectors:

U.S. Pat. No. 4,543,930, Baker, discloses an engine which includes a main fuel injector and a pilot fuel injector. The pilot and the main fuel may be the same fuel. The pilot injector injects from five to fifteen percent of the total fuel at different timings, depending upon the quantity of pilot fuel injected, the fuel cetane number and speed and load. The pilot fuel injector is directed toward the centerline of the diesel cylinder and at an angle toward the top of the piston. This avoids the walls of the cylinder. Stratification of the early injected pilot fuel is needed to reduce the fuel-air mixing rate, prevent loss of pilot fuel to quench zones and keep the fuel-air mixture from becoming too fuel lean to become effective. The pilot fuel injector can include a single hole for injection of the fuel and is directed at approximately 48 degrees below the head of the cylinder.

U.S. Pat. No. 4,416,229, Wood, discloses a system whereby diesel fuel is supplied to the cavity of an injector at a location near the valve seat. Alternative fuel is supplied to the cavity of the injector. The diesel fuel is supplied at a relatively low pressure which does not move the valve member to open position. The alternative fuel is supplied at a relatively high pressure which is sufficient to move the valve member to open position at intervals just prior to the movement of the piston of the cylinder of the chamber into which the fuel is to be injected into high centre position during its compression stroke. The fuel supply prevents the back flow of fuel, and thus maintains the cavity filled with fuel, except when alternative fuel is displaced within the cavity by the supply of diesel fuel. A plume of both fuels having the diesel fuel at its tip is injected into the chamber to enable the diesel fuel to be ignited by the compression in the chamber and the alternative fuel to be ignited by the diesel fuel.

U.S. Pat. No. 4,742,801, Kelgard, discloses a dual fuel engine which is operated with straight diesel fuel or with gaseous fuel and pilot injection of diesel fuel. The invention is primarily concerned with dual fuel engines for use in over-the-road vehicles but it has other applications. The invention also contemplates using the heat from the cooling water of the jackets of the engine to vaporize a liquid fuel into a gaseous state which is thereafter injected directly into the cylinders of the engine during operation on the dual fuel cycle.

U.S. Pat. No. 5,067,467, Hill et al., discloses a novel device for compressing and injecting gaseous fuel from a variable pressure gaseous fuel supply into a fuel receiving apparatus. The intensifier-injector compresses and injects gaseous fuel from a variable pressure source into the cylinder of a positive displacement engine. The intensifier-injector for gaseous fuels in an internal combustion engine comprises a device which utilizes the compressed gas from the chamber of the internal combustion engine, or compressed fluid or gas from an external compressor, to drive an intensifier means which raises the pressure of fuel gas supplied to the internal combustion eengine for rapid late-cycle injection into the cylinder of the internal combustion engine. In this device, gaseous fuel and liquid pilot fuel are mixed together and injected through the same holes.

U.S. Pat. No. 5,315,973, Hill et al., discloses a related device for compressing and injecting gaseous fuel from a variable pressure gaseous fuel supply into the fuel receiving apparatus. The intensifier-injector for gaseous fuels in an internal combustion engine comprises a mechanism which utilizes the compressed gas from an external compressor to drive an intensifier means which raises the pressure of fuel gas supplied to the internal combustion engine for rapid late-cycle injection into the cylinder of the internal combustion engine. In this device, the gaseous fuel and liquid pilot fuel are mixed together and injected through the same holes.

U.S. Pat. No. 5,329,908, Tarr et al., discloses a related fuel injector which has a gas accumulator of a volume that is at least ten times the maximum amount of fuel which would have to be injectable thereby. A solenoid-operated poppet valve with an end face that opens into the combustion cylinder and is shaped to deflect a portion of the fuel injected into direct contact with the ignition plug is also disclosed. In a first embodiment, using a variable fuel supply, an electronic control unit (ECU) controls the injection timing to inject the compressed gas into the respective cylinders as each cylinder's piston nears its top dead centre position to obtain diesel engine-like efficiencies so long as the compressed gas supply pressure is sufficiently high. When the compressed gas supply pressure becomes too low for high efficiency operation, the ECU changes the manner of operation so that fuel is injected into the engine when the piston is near its bottom dead centre position so that it can be premixed with air prior to ignition to produce gasoline engine-like efficiencies.

Baker (U.S. Pat. No. 4,543,930) and Kelgard (U.S. Pat. No. 4,742,801) use two injectors. Wood (U.S. Pat. No. 4,416,229), Hill et al. (U.S. Pat. No. 5,067,467) and Hill et al. (U.S. Pat. No. 5,315,973) inject the two fuels together. Tarr et al. (U.S. Pat. No. 5,329,908) uses solenoid actuation of a gas injector only.

The Finnish work at Wartsila Diesel International pertains to the usage of directly injected natural gas with pilot diesel fuel and indicates the potential of the technology to use natural gas while retaining the high power output of diesel engines.

Wartsila Diesel International Oy of Finland owns the following patents and patent applications relating to dual fuel injectors:

1. European patent application 92305415.9, filed Jun. 12, 1992, entitled "Improved Fuel Injection Valve Arrangement and Engine Using Such an Arrangement";
2. U.S. Pat. No. 5,199,398, filed Jun. 8, 1992, entitled "Fuel Injection Valve Arrangement";
3. EP0778410, filed Jun. 12, 1996, entitled "Injection Valve Arrangement for an Internal Combustion Engine";
4. EP0787900, filed Jan. 28, 1997, entitled "Injection Valve Arrangement";
5. EP0718489, filed Jun. 12, 1996, entitled "Injection Arrangement for an Internal Combustion Engine"; and
6. U.S. Pat. No. 5,060,610, filed Sep. 21, 1990, entitled "Combustion Process for Internal Combustion Engine Using Gaseous Fuel".

U.S. Pat. No. 5,199,398, Nylund and European Patent No. 0,520,659 A1, Nylund disclose a fuel injection valve arrangement for so called dual fuel engines using a pilot fuel needle and an axially movable, substantially hollow valve member permitting the injection of a gaseous fuel. The two needles are separately controllable.

European Patent No. 0,778,410, Nylund, discloses an injection valve arrangement for an internal combustion engine using a pilot needle and at least two valves for the injection of the gaseous fuel. The pilot fuel injection is controlled externally to the injector, while a main valve controls the admitting of hydraulic fluid to actuate the gas needle injection valves.

European Patent No. 0,718,489 A1, Hellen, discloses an injection arrangement for an internal combustion engine using a pilot needle and a separately controllable valve for the injection of a different medium. The pilot fuel injection is controlled externally to the injector, while a main valve controls the admitting of hydraulic fluid to actuate the different medium injection valve.

European Patent No. 0,787,900, Jay and Prillwitz, discloses an injection valve arrangement with two injection valves to inject an additional pressure medium into the combustion chamber of an internal combustion engine.

Nylund (U.S. Pat. No. 5,199,398, EP 0,520,659 A1, EP 0,778,410), Hellen (EP 0,718,489 A1) and Jay and Prillwitz (EP 0,787,900) use two different sources of fluid for the actuation of the usual liquid fuel and that of the additional fuel. Also, the metering of the liquid or pilot fuel is performed externally, rather than internally, to the injector.

U.S. Pat. No. 4,736,712 discloses a self purging dual fuel injector which injects sequentially two fuels through the same series of holes. Because the same series of holes is used for both fuels, the fuels must have a similar density in order to maintain reasonable injection duration. The disclosed invention does not discuss the actuation of the needle used.

SUMMARY OF THE INVENTION

The invention is directed to a dual fuel injector comprising: (a) an injector body; (b) an inlet port in the injector body for enabling pressurized hydraulic fluid from a hydraulic fluid source to be introduced into the interior of the injector body, said hydraulic fluid being of a pressure slightly above that of the gaseous fuel pressure in order to maintain sealing and prevent leakage of gas into the hydraulic oil; (c) a first inlet port in the injector body for enabling a first fuel to be introduced into the interior of the injector body; (d) a first injection valve in the injector body connected to the first inlet port for controlling injection of the first fuel from the injector through a first fuel ejection port; (e) a second inlet port in the injector body for enabling a second fuel to be introduced into the interior of the injector body; (f) a second injection valve in the injector body connected to the second inlet port for controlling injection of the second fuel from the injector through a second fuel ejection port; (g) a first control valve which causes the hydraulic fluid to actuate the first injection valve; (h) a second control valve which causes the hydraulic fluid to actuate the second injection valve; (i) a metering device in the injector body for metering the amount of first fuel injected by the first injection valve; and (j) a seal in the injector body which prevents leakage of the second fuel into the first fuel.

The first fuel of the injector can be a pilot fuel. The second fuel can be a high pressure gaseous fuel. The hydraulic fluid can be the first fuel or another fuel may be the first fuel. The first injection valve and the second injection valve can be needle valves. The first needle valve can control injection of the pilot fuel and the second needle valve can concentrically enclose the first needle valve and control injection of the gaseous second fuel.

The first control valve can be electronically controlled and electrically operated. The second control valve can be electronically controlled and mechanically operated or electrically operated. The metering device can be an intensifier. The seal can be hydraulic fluid which can be located between the first fuel and the second fuel or in a cavity between the second needle valve and the injector body.

The first valve can be controlled by a first solenoid. The second valve can be controlled by a second solenoid. The injector can include a solenoid which can control admission of hydraulic fluid to the intensifier, which intensifier can control admission of first fuel to the first fuel injection valve. A second solenoid can control admission of the second fuel to the second fuel valve. The injector can include a one-way check valve which can control admission of hydraulic fluid from a hydraulic fluid inlet to the intensifier.

The gaseous second fuel can be ejected from ports located in the tip of the injector body, and the pilot first fuel can be ejected through ports located in the tip of the gaseous fuel injection needle valve.

The control valve can have a spring which biases the valve. The first control valve (controlled by the first solenoid) can have a spring which biases the first valve and the second valve controlled by the second solenoid can have a spring which biases the second valve. The positions of the first and second needle valves can be biased by a spring.

The invention is also directed to a fuel injector for injecting two fuels into an internal combustion engine comprising: (a) an injector body defining a fluid inlet port, a first fuel inlet port, a second fuel inlet port, a vent port, first fuel outlet ports and second fuel outlet ports; (b) a first fuel injection valve communicating with the first fuel inlet port, the first fuel injection valve constructed to maintain a first position upon application of pressure from the fluid inlet port and to move responsive to venting of pressure through the vent port; (c) a selectively operable valve communicating with the fluid inlet port and the vent port to vent pressure applied to the first fuel injection valve; (d) a metering device communicating with the first fuel injection valve and constructed to supply first fuel through the fluid outlet ports; (e) a second fuel injection valve communicating with the second fuel inlet port, and the second gaseous fuel outlet ports, the second fuel injection valve constructed to enable communication of fuel from the second fuel inlet port to the second fuel outlet ports upon release of fluid pressure from the fluid inlet port and to terminate communication of second fuel from the second fuel inlet port through the second fuel injector valve upon application of pressure from the fluid inlet port; and (f) a seal preventing leakage between the first fuel passage and the second fuel.

BRIEF DESCRIPTION OF DRAWINGS

In drawings which illustrate specific embodiments of the invention, but which should not be considered as restricting the spirit or scope of the invention in any way.

GENERAL DESCRIPTION OF THE INVENTION

The invention is a dual fuel injector capable of injecting sequentially a liquid pilot fuel and a main high-pressure gaseous fuel in an internal combustion engine. The invention specifically pertains to a dual fuel injector that is operated using a constant high-pressure source of hydraulic fluid (common rail) and one or two electrically-operated electronically-controlled valves. In a preferred embodiment, the injector is constructed of the following elements:

An intake port for pressurized hydraulic fluid from a constant pressure source (common rail), Two concentric needle valves located near the tip of the injector allowing the injection of two different fuels, An electronically-controlled electrically-operated valve which allows the hydraulic fluid to actuate a pilot fuel needle valve, A metering device for the pilot fuel, with associated refilling mechanism, A hydraulically or electrically operated valve which allows the hydraulic fluid to actuate a gaseous fuel needle valve, An intake port for high-pressure gaseous fuel, and A liquid seal preventing the leakage of high-pressure gaseous fuel into the actuating hydraulic fluid. The liquid seal is the hydraulic fluid and confines the pressure of the hydraulic fluid.

One novelty feature of the injector is the combination of a liquid fuel metering and injection mechanism and a gaseous fuel metering and injection system within the same injector, and using the same source of pressurized hydraulic fluid.

A number of variations of the injector can be utilized, such as:

The manner in which the hydraulic fluid actuates the gaseous fuel needle valve,

The manner in which the pilot fuel is metered,

Using a pilot fuel that differs from the hydraulic fluid.

DETAILED DESCRIPTION OF SPECIFIC EMBODIMENTS OF THE INVENTION

Figure 1:
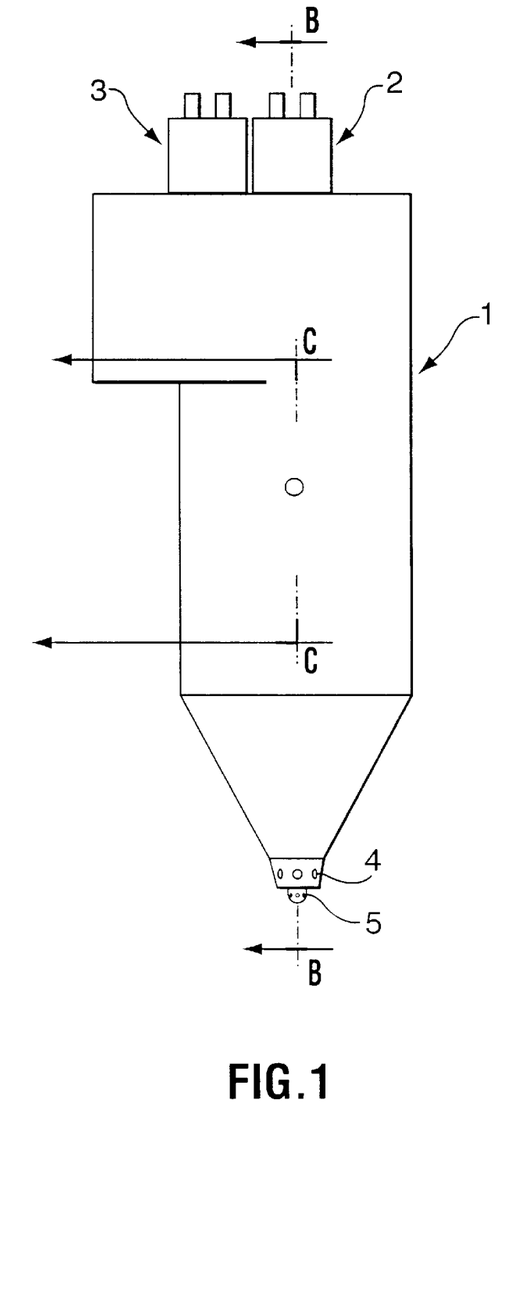
FIGS. 1 and 2 illustrate front and side elevation views of the double solenoid dual fuel injector.
Figure 2:
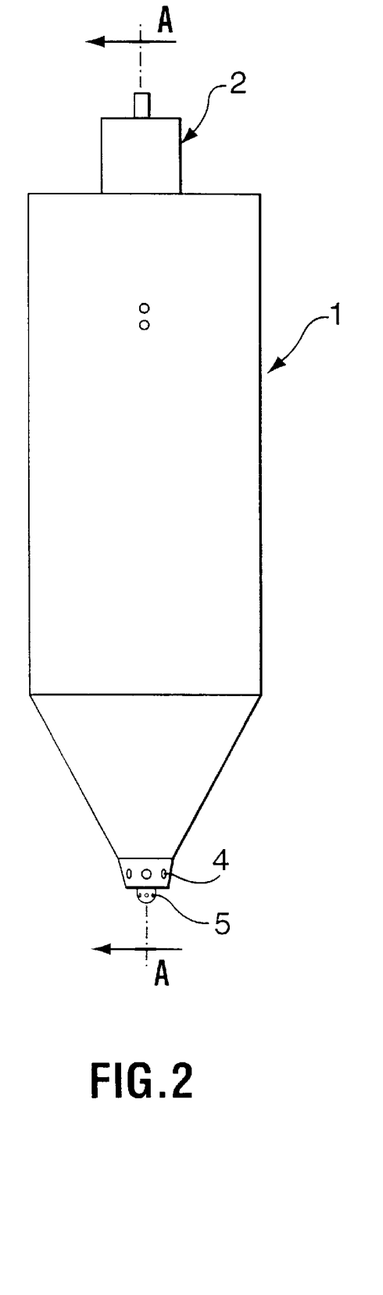

Referring to the drawings, FIGS. 1 and 2 show front and side elevation views of an embodiment of the invention wherein two electrically-operated electronically-controlled valves are used, one to control the injection of the pilot fuel and one to control the injection of the main gaseous fuel. Specifically, FIG. 1 shows a front view of the exterior of the dual fuel injector 1, with the dual solenoids 2 and 3 at the top and the gaseous fuel holes 4 and liquid fuel holes 5 at the bottom. FIG. 2 illustrates a side view of the dual-fuel injector 1 with the solenoid 2 at the top.

FIGS. 3 through 11 illustrate different internal embodiments of the basic dual electrical control valve injector 1. Since the exterior of the injector 1 as illustrated in FIGS. 1 and 2 remains the same for the internal embodiments illustrated in FIGS. 3 to 11, for purposes of brevity, and to eliminate redundancy, FIGS. 1 and 2 are not repeated. The internal construction for the basic dual electrical control valve injector 1 illustrated in FIGS. 1 and 2 can be one of the three designs illustrated and discussed as embodiments 1(a), 1(b) and 1(c), in the following discussion relating to FIGS. 3 to 11.

Figure 3:
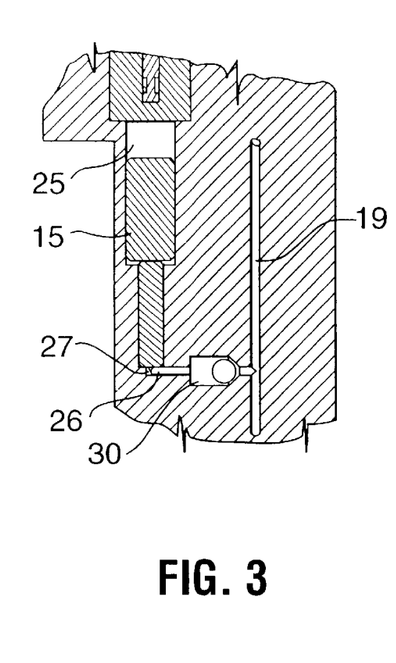
FIGS. 3, 4 and 5 show respectively detail, side and front section views of a first embodiment of double solenoid dual fuel injector taken along sections lines C—C, A—A, and B—B shown externally in FIGS. 1 and 2. This embodiment of the injector uses high pressure hydraulic fluid to maintain the gaseous fuel valve closed.
Figure 4:
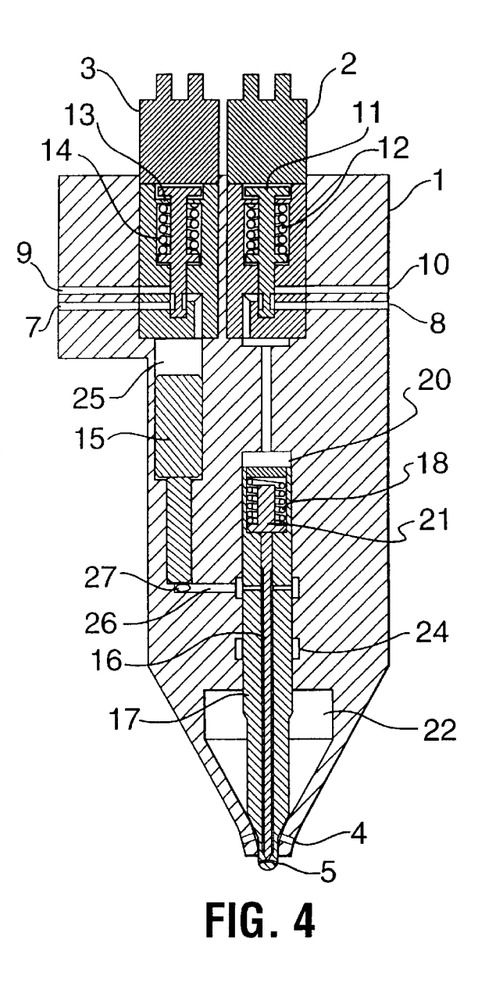
Figure 5:
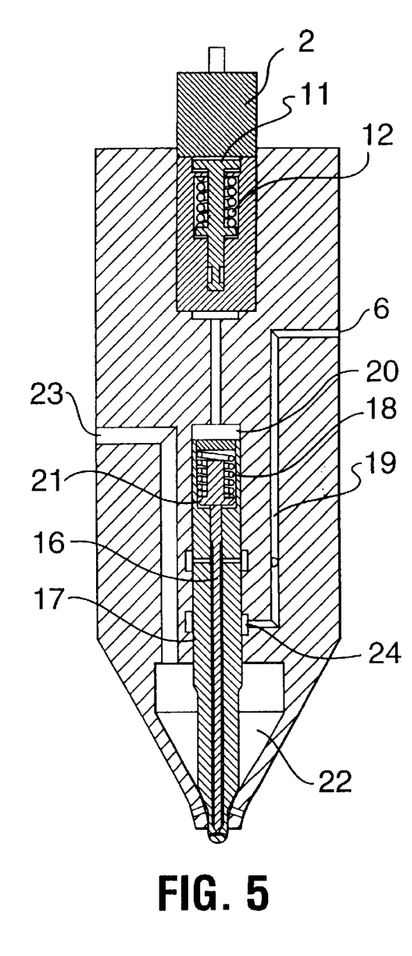

1(a) Double Solenoid Gaseous Fuel Valve and Pilot Fuel Valve Injector Using High Pressure Hydraulic Fluid to Maintain the Gaseous Fuel Needle Valve Closed FIGS. 3, 4 and 5 show respectively detail, side and front section views of a first embodiment of double solenoid dual fuel injector taken along sections lines C—C, A—A, and B—B shown externally in FIGS. 1 and 2. This embodiment of injector uses high pressure hydraulic fluid to maintain the gaseous fuel valve closed.

FIGS. 3, 4 and 5 illustrate in detail the internal construction of the embodiment 1(a) double solenoid dual fuel injector 1. The injector 1 has three hydraulic fluid inlets 6, 7 and 8, two venting ports 9 and 10, and a gaseous fuel control solenoid 2 and a pilot fuel control solenoid 3 at the top. The injector 1 includes a gaseous fuel control valve 11 and a surrounding gaseous fuel control valve spring 12 positioned below the gaseous fuel control solenoid 2. The injector 1 also includes a pilot fuel control valve 13 and a surrounding pilot fuel control valve spring 14 positioned below the pilot fuel control solenoid 3. In the embodiment presented, valves 11 and 13 are three-way valves and are normally in a lower opened position. The injector 1 also includes a pilot fuel intensifier 15 which is illustrated in FIGS. 3 and 4. The intensifier 15 is linked to and located below the pilot fuel control valve 13.

As seen specifically in FIG. 3, a check valve 30 is associated with the intensifier 15. Port 19, as seen in FIGS. 3 and 5, connects the hydraulic fluid inlet 6 to the intensifier 15 through check valve 30. The injector 1 has in the center thereof a long vertical pilot fuel needle valve 16, with a needle valve spring 18 at the top thereof. It also has a long vertical gaseous fuel needle valve 17, which surrounds the needle valve 16 and provides a concentric needle arrangement. A series of gaseous fuel injection holes 4 at the bottom of injector 1 and pilot fuel injection holes 5 are formed in the bottom of needle 17. These holes 4 and 5 are located in the bottom of the injector 1 and enable gaseous fuel and pilot fuel to be injected into the combustion chamber of an engine (not shown).

A hydraulic fluid cavity 20 is located below the gaseous fuel control valve 11 and spring 12 and above the gaseous fuel needle valve 17. The pilot fuel needle valve stop 21, which is enclosed by needle valve spring 18, is located above the pilot fuel needle valve 16. The cavity 20 communicates with hydraulic fluid inlet port 8. A gaseous fuel cavity 22 is located in the bottom region of injector 1 and surrounds the lower portion of the gaseous fuel needle valve 17. Gaseous fuel is supplied to cavity 22 through inlet 23. Differential pressures within the injector 1 and particularly between the main body of the injector 1 and the gaseous fuel needle valve 17 are sealed by hydraulic oil in cavity 24, as best seen in FIGS. 4 and 5.

Operation of Dual Fuel Injector Embodiment 1(a)

Hydraulic fluid pressurized to a constant level by an engine driven pump (common rail system) is introduced through ports 6, 7 and 8 into the injector 1 (see FIGS. 4 and 5). The pressurized hydraulic fluid fills the cavity 20, and fills the pilot fuel metering area above and below the intensifier 15 through ports 7 and 19, and through the fill check valve 30 (see FIG. 3). The pressurized hydraulic fluid introduced through inlet 6 is also used as a sealing fluid in cavity 24, which surrounds the gaseous fuel needle valve 17. Because the hydraulic fluid is used for sealing, as well as actuation, it must be pressurized to a pressure slightly higher than that of the main gaseous fuel pressure in cavity 22 to prevent the leakage of gaseous fuel into the actuating hydraulic fluid around the gaseous fuel needle valve 17 (see FIG. 4).

Prior to fuel injection, the gaseous fuel control solenoid 2 and the pilot fuel control solenoid 3 (see FIG. 4) are de-energized. The respective gaseous fuel control valve 11 and pilot fuel control valve 13 below the two solenoids 2 and 3 are maintained in their lower positions by respective coil springs 12 and 14. The pressurized hydraulic fluid in cavity 20 which has been delivered through port 8 maintains the interior pilot fuel needle valve 16 and the exterior gaseous fuel needle valve 17 in a downward closed position. The needle valve coil spring 18 also helps maintain the pilot fuel needle valve in a closed position. The difference in area between the top and bottom of intensifier 15 keeps the intensifier 15 in its lower position.

The metering of pilot fuel in the injector 1 is performed in one of two ways as follows. In both methods, the pilot fuel solenoid 3 is first energized which thereby moves the pilot fuel control valve 13 to its upper position. Upon energizing the control pilot fuel solenoid 3, the valve 13 disconnects the cavity 25 from the supply of high pressure hydraulic fluid and connects the cavity 25 above intensifier 15 with the drain outlet 9. When connected to drain port 9, the pressure above the intensifier 15 falls to drain pressure level, a level which is significantly lower than the pressure in the main hydraulic fluid. As the pressure below the intensifier 15 remains at main hydraulic pressure while the pressure above intensifier 15 falls to drain pressure, the intensifier 15 is forced upward.

In the first method of metering the pilot fuel, the solenoid 3 is de-energized when the required amount of pilot fuel has been introduced into space 27 below intensifier 15. The pilot fuel control valve 13 is forced by the pilot fuel control valve spring 14 to the closed position and hydraulic pressure is reapplied on top of the intensifier 15 through inlet 7 (see FIG. 4). This causes the pressure to intensify below the intensifier 15, and thus the port 26 closes check valve 30. When the solenoid 3 is de-energized, the injection of pilot fuel commences immediately as described below, such that this pilot fuel-metering step must be performed immediately before the required injection into the combustion chamber.

In the second method of metering the pilot fuel, the intensifier 15 rises until it reaches the top of cavity 25, instead of interrupting the rise as in the first method. The volume of hydraulic fluid admitted into space 27 underneath the intensifier 15 is then the volume of pilot fuel that will be injected. In this method the volume of the pilot fuel injected is constant over the whole operation range. In this second method, the metering phase can be performed well in advance of the injection of the pilot fuel into the combustion chamber.

In either method, the injection of metered pilot fuel starts as solenoid 3 is de-energized and the pilot fuel control valve 13 drops due to the force of spring 14. The pressure above the intensifier 15 then becomes the hydraulic fluid pressure, which in turn pushes the intensifier 15 down. The intensified pressure below the intensifier 15 thus rises and through port 26 (see FIG. 4) causes the pilot fuel needle valve 16 to lift. The metered pilot fuel is then injected into the engine combustion chamber (not shown) through holes 5 in the bottom tip of the gaseous fuel needle valve 17. The upward travel of the internal pilot fuel needle valve 16 is limited by a mechanical stop 21 to avoid causing long term fatigue in the needle valve spring 18.

When the intensifier 15 reaches its lower limit of travel, the pressure underneath the intensifier 15 drops as injection of pilot fuel into the combustion chamber continues. The pilot fuel injection pressure continues to drop until the pressure becomes too low to maintain the pilot fuel needle valve 16 in a raised open position. The pilot fuel needle valve 16 then drops to a closed position and the injection of pilot fuel terminates.

In this system, the source of high pressure fluid from inlet 6 and through ports 19 and 26 maintains a high pressure around the pilot fuel needle valve 16, and below intensifier 15, thereby preventing combustion gases from entering the injector 1 through holes 5.

The injection of gaseous fuel takes place when the gaseous fuel control solenoid 2 is energized. Upon energizing the solenoid, the valve 11 lifts and opens, disconnecting the cavity 20 from the high pressure inlet 8 and connecting cavity 20 with drain port 10. The pressure in cavity 20 above the gas needle 17 then drops to drain pressure through venting port 10. The high pressure of the gaseous fuel in cavity 22 as introduced through port 23 (see FIG. 5) forces the gaseous fuel needle valve 17 up and the gaseous fuel in cavity 22 is thereby injected into the combustion chamber of the engine through holes 4 in the bottom tip of the injector 1. The injection of gaseous fuel stops when the solenoid 2 is de-energized and the gaseous fuel control valve 11 is closed by the gaseous fuel control valve spring. The pressure in the cavity 20 rises to the hydraulic fluid pressure through inlet port 8. The gaseous fuel needle valve 17 is forced closed by the high pressure hydraulic fluid in the cavity 20 and the holes 4 are closed.

Figure 6:
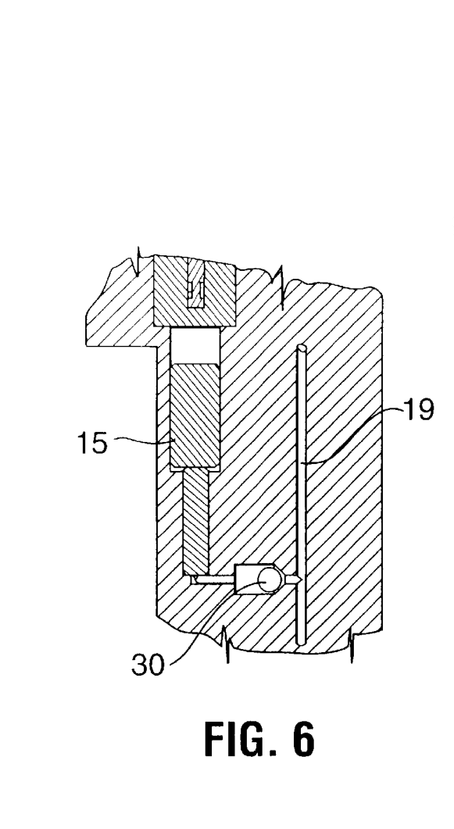
FIGS. 6, 7 and 8 show respectively detail, side and front section views of a second embodiment of double solenoid dual fuel injector taken along sections lines C—C, A—A, and B—B shown externally in FIGS. 1 and 2. This embodiment of the injector uses high pressure hydraulic fluid to open the gaseous fuel valve.
Figure 7:
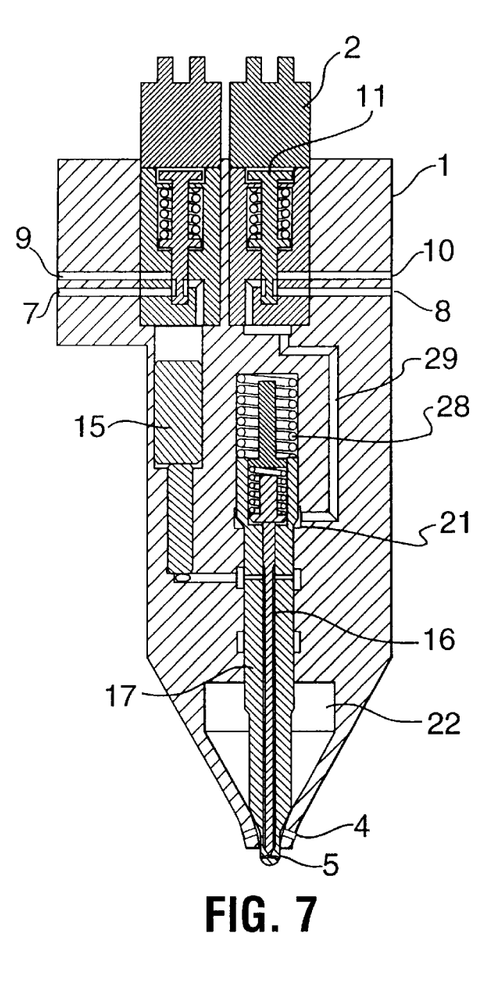
Figure 8:
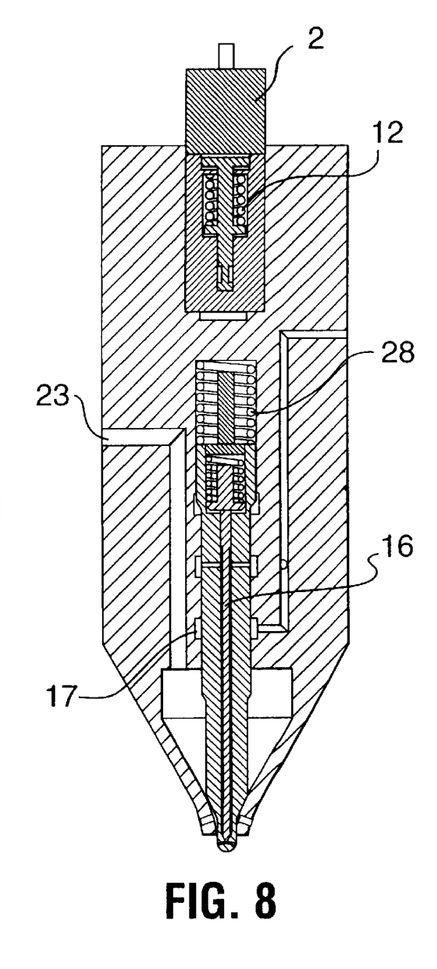
Figure 10:
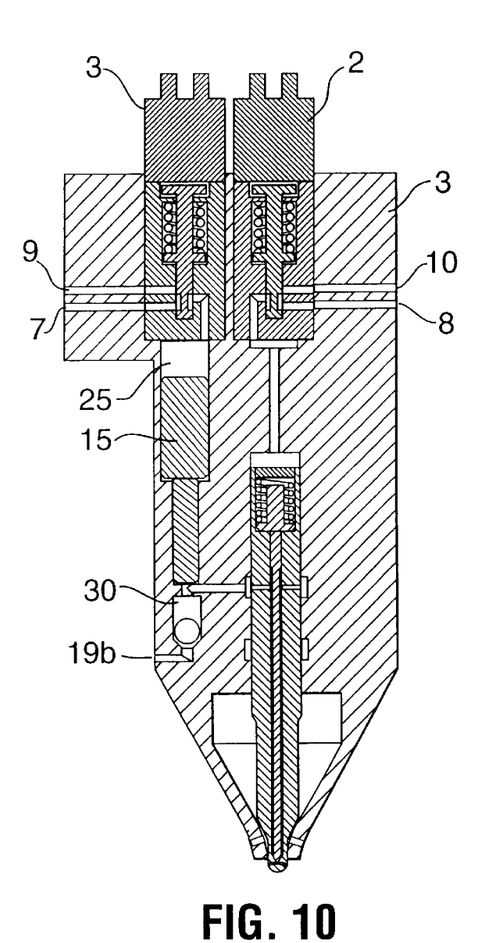

1(b) Double Solenoid Gaseous Fuel Valve and Pilot Fuel Valve Injector Using High Pressure Hydraulic Fluid to Actuate the Gaseous Fuel Needle Valve FIGS. 6, 7 and 8 show respectively in detail, side and front section views of a third embodiment of double solenoid dual fuel injector taken along sections lines C—C, A—A, and B—B shown externally in FIGS. 1 and 2. This embodiment of injector uses high pressure hydraulic fluid to open the gaseous fuel valve. This second embodiment of the double solenoid dual fuel version of the invention has many of the same elements as those presented in FIG. 3, 4 and 5, but has a different actuation of the gaseous fuel needle. Referring to FIG. 10, high pressure hydraulic fluid enters the injector 1 through fluid inlet 10. Outlet 8 is a venting port. The gaseous fuel needle valve 17 is maintained in a downward closed position by the coil spring 28. This coil spring 28 is not present in embodiment 1(a). Embodiment 1(b) also includes a high pressure hydraulic fluid port 29.

The operation of the embodiment 1(b) injector illustrated in FIGS. 6, 7 and 8 is fundamentally the same as described for embodiment 1(a) above, except for the gaseous fuel injection, which operates as follows. Upon energizing solenoid 2, the gaseous fuel control valve 11 is moved to its upper position connecting the high pressure inlet port 10 with port 29 and cavity 21 below the shoulder of the gaseous fuel needle valve 17. When the combined forces of the hydraulic fluid pressure in cavity 21 and the gaseous fuel pressure in cavity 22 acting upwardly on gaseous fuel needle 17 are high enough to overcome the downward force exerted by the coil spring 28, the gaseous fuel needle valve 17 lifts and opens. The gaseous fuel is then injected through holes 4 in the tip of injector 1 into the combustion chamber. A gaseous needle valve stop inside spring 28 limits the travel of the needle valve 17 and prevents long term fatigue of the coil spring 28. The injection of gaseous fuel stops when the solenoid 2 is de-energized. The gaseous fuel needle valve 17 then drops to a closed position, closing the holes 4 and the injection of gaseous fuel terminates.

All other elements of the injector depicted in embodiment 1(b) remain the same as those presented in embodiment 1(a).

Figure 9:
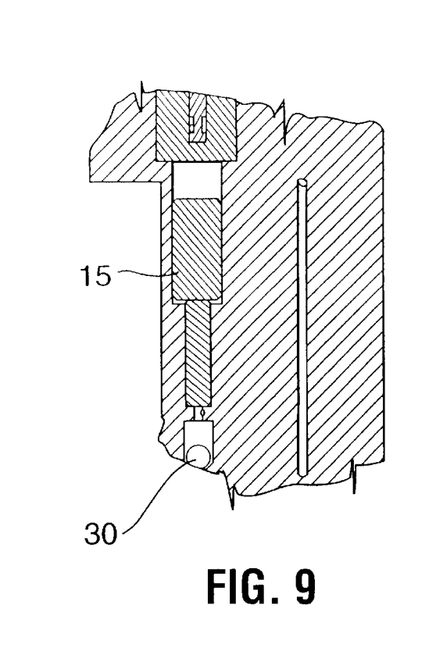
FIGS. 9, 10 and 11 show respectively detail, side and front section views of a third embodiment of double solenoid dual fuel injector taken along section lines C—C, A—A and B—B, shown externally in FIGS. 1 and 2. This embodiment of the injector shows an injector in which the pilot fuel differs from the hydraulic fluid.
Figure 11:
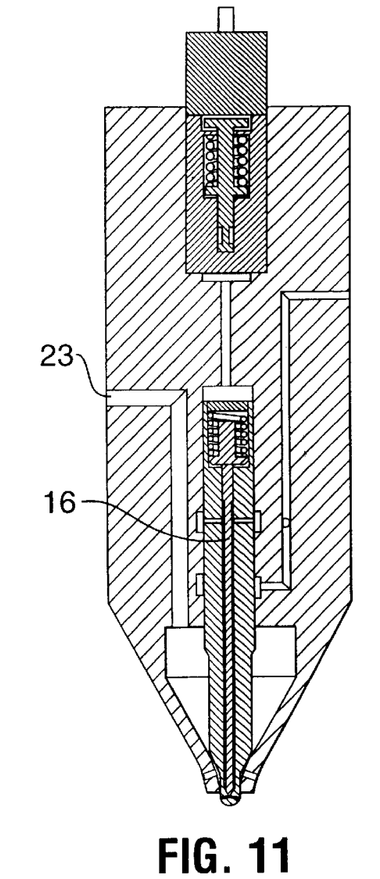

1(c) Double Solenoid Gaseous Fuel Valve and Pilot Fuel Valve Injector Using a Pilot Fuel Other than the Hydraulic Fluid FIGS. 9, 10 and 11 show respectively in detail, side and front section views a fourth embodiment of a double solenoid dual fuel injector taken along section lines C—C, A—A and B—B, shown externally in FIGS. 1 and 2. This embodiment is the same as that presented in section 1(a) with the exception of a new pilot fuel inlet 19b, which connects with the underside of intensifier 15 through a check valve 30. The pilot fuel is maintained at a pressure similar to that of the hydraulic fluid.

The operation follows closely that described for embodiment 1(a). When the solenoid 3 is energized, the pressure in cavity 25 falls to drain pressure. The pressure of the pilot fuel introduced through port 19b and through check valve forces the intensifier 15 upward, and pilot fuel fills the volume underneath intensifier 15. Two different pilot metering sequences can be followed as described in embodiment 1(a). The gaseous fuel injection is identical to that described in embodiment 1(a).

Figure 12:
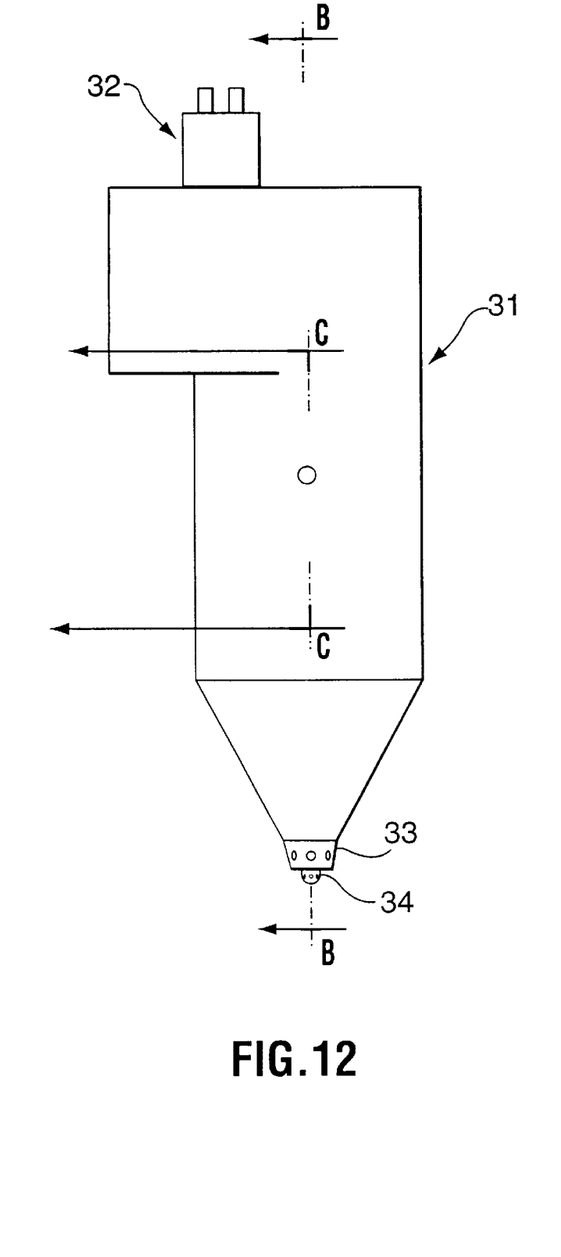
FIGS. 12 and 13 illustrate front and side elevation views of a single solenoid dual fuel injector.
Figure 13:
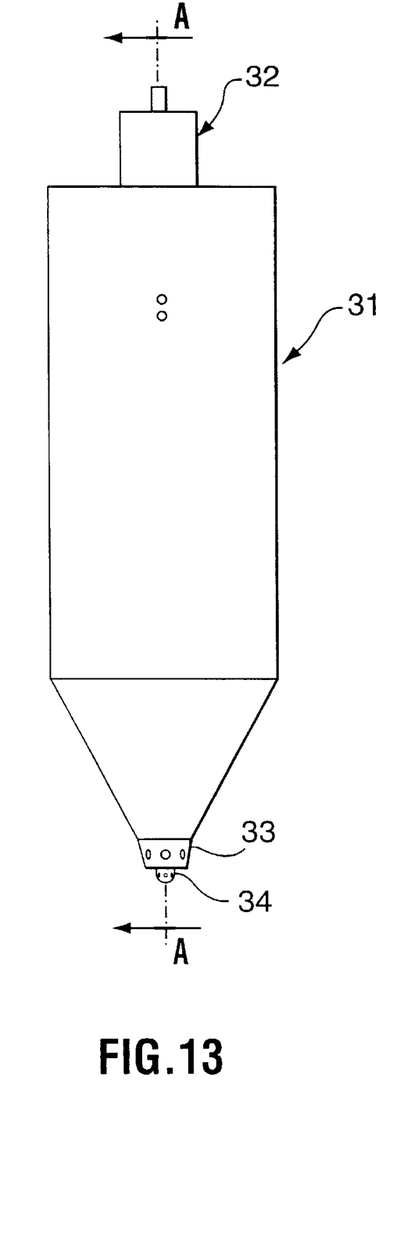

2(a) Single Solenoid Gaseous Fuel Valve and Pilot Fuel Valve Injector Using High Pressure to Maintain the Gaseous Fuel Needle Valve Closed Referring to the drawings, FIGS. 12 and 13 show respectively front and side elevation views of an embodiment of the invention wherein a single solenoid actuated valve is used to control the dual fuel injector. As seen in FIGS. 12 and 13, the injector 31 has a single solenoid 32 at the top. Pilot fuel holes 34 and gaseous fuel holes 33 are located at the bottom. Again, for brevity, the exterior of the single solenoid injector 31 is illustrated only once, although two different internal embodiments are illustrated in FIGS. 14 to 19 and discussed below.

Figure 14:
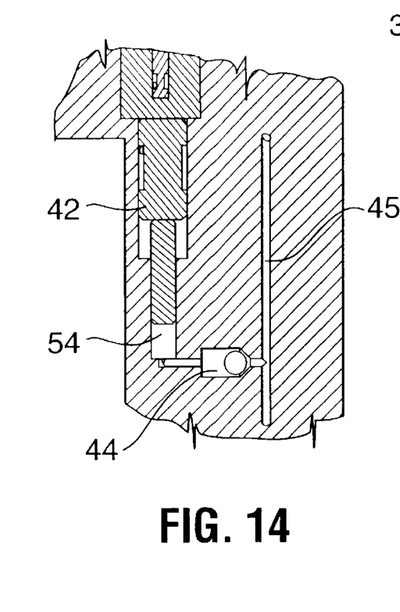
FIGS. 14, 15, and 16 show respectively detail, side and front section views of a first embodiment of single solenoid dual fuel injector taken along sections lines C—C, A—A, and B—B shown externally in FIGS. 12 and 13. This embodiment of the injector uses high pressure hydraulic fluid to maintain the gaseous fuel valve closed, an intensifier-plunger which acts as a normally closed valve.
Figure 15:
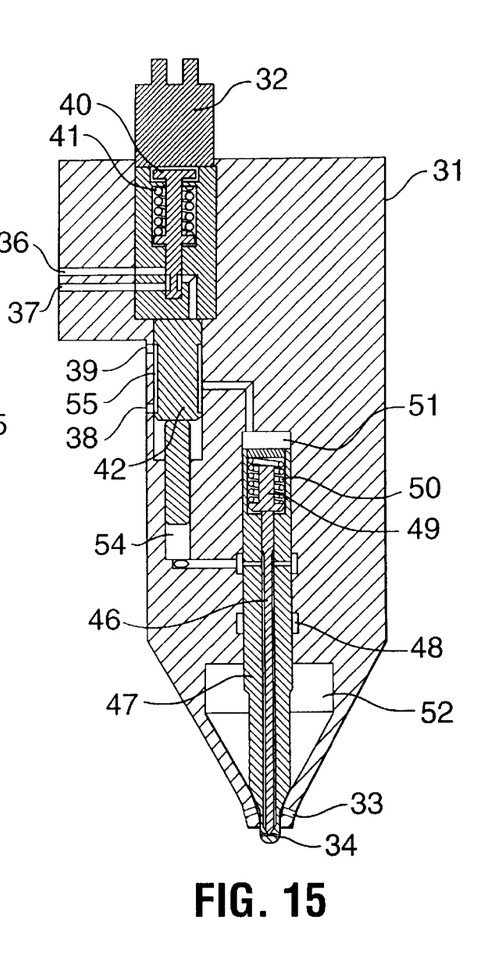
Figure 16:
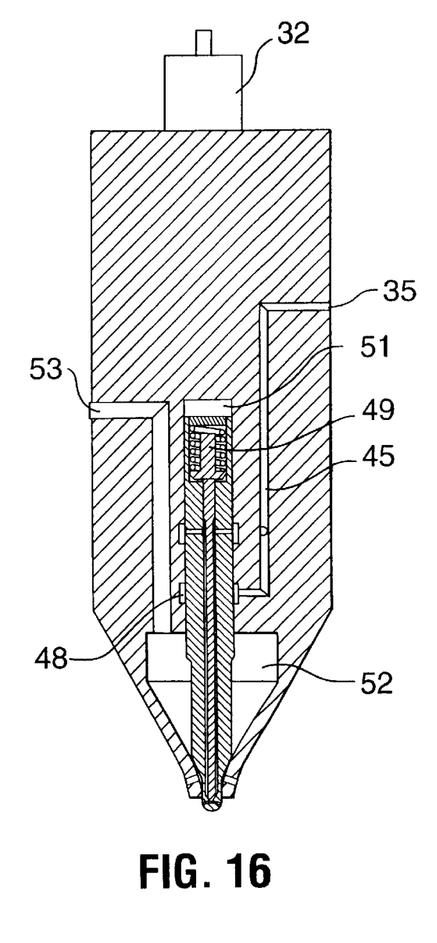

FIGS. 14, 15, and 16 show respectively detail, side and front section views of a first embodiment 2(a) of single solenoid dual fuel injector taken along sections lines C—C, A—A, and B—B shown externally in FIGS. 12 and 13. This embodiment of injector uses high pressure hydraulic fluid to maintain the gaseous fuel valve closed and an intensifier-plunger which acts as a valve. In this embodiment, an electrically-operated electronically-controlled valve (solenoid 32) is used to control the injection of the pilot fuel from holes 34. A hydraulic valve actuated by the high pressure hydraulic fluid controls the injection of the gaseous fuel from holes 33.

As seen in FIGS. 14, 15 and 16, the single solenoid injector 31 is substantially similar in construction to the dual solenoid injector illustrated and discussed previously in relation to the three embodiments illustrated in FIGS. 1 to 9. It includes a single solenoid 32, three hydraulic fluid inlet ports 35, 36 and 39, and two venting ports 37 and 38. A main pilot fuel control valve 40 is positioned below the solenoid 32. A coil spring 41 is associated with the pilot fuel valve control 40. In the embodiment presented, control valve 40 is a normally closed three-way valve, in a down position.

The single solenoid dual fuel injector 31 also includes a pilot fuel intensifier 42, which is best illustrated in FIGS. 14 and 15. A wide groove 55 around the perimeter of intensifier 42 lines up with either port 39, when the intensifier 42 is in an upward position, or with port 38 when the intensifier 42 is in a downward position, enabling the intensifier 42 to act as a gaseous fuel control valve. A check valve 44 (see FIG. 14) is associated with the intensifier 42.

The injector 31 also includes a central long vertical pilot fuel needle valve 46, a concentrically surrounding gaseous fuel needle valve 47, and a spring 50 for urging the pilot fuel needle valves 46 into a downward closed position. A series of injection holes 33, for injection of gaseous fuel into the combustion chamber of the engine (not shown), are located in the bottom region of the injector 31. A corresponding series of pilot fuel injection holes 34 are located in the bottom of the gaseous fuel injection needle 47.

A port 45 (see FIG. 16) connects the hydraulic fluid inlet port 35 (see FIG. 16) with a cavity 51 located above needle valve closing spring 50 and above fuel needle valves 46 and 47. Cavity 48, around gaseous fuel needle valve 47, which contains pressurized hydraulic fluid, provides a seal against differential pressures, and is illustrated in FIGS. 15 and 16. The pilot fuel needle valve 46 includes a mechanical stop 49 which restricts upward movement of the needle valve 46. A high pressure gaseous fuel cavity 52 supplied through port 53 is located in the bottom region of the injector 31, around gaseous fuel needle valve 47.

Operation of Single Solenoid Dual Fuel Injector 2(a)

Hydraulic fluid pressurized to a constant level by an engine driven pump (common rail system) is introduced through inlet ports 39, 35 and 36 in the injector 31. The pressurized hydraulic fluid fills the pilot fuel metering cavity 54 below the intensifier 42 through port 45 and through the fill check valve 44 (see FIG. 14). The pressurized hydraulic fluid is also used as a sealing fluid in cavity 48 surrounding gaseous needle valve 47. As with the double solenoid injector discussed previously, the hydraulic fluid used for sealing must be pressurized to a pressure slightly higher than that of the main gaseous fuel pressure to prevent the leakage of gaseous fuel from cavity 52 into the actuating hydraulic fluid around the gaseous fuel needle valve 47.

Prior to fuel injection, the solenoid 32 is de-energized and the pilot fuel control valve 40 is maintained in its lower position by spring 41. The pilot fuel and gaseous needle valves 46 and 47 are maintained closed in a lower position by the spring 50 and by the hydraulic fluid pressure in cavity 51 provided through inlet 38. The pilot fuel intensifier 42 is maintained in its upper position by the force exerted by the high pressure hydraulic fluid in cavity 54 below intensifier 42 provided through check valve 44 and inlet 35.

The injection of the pilot fuel is initiated by energizing the solenoid 32. This causes valve 40 to move up and open. It thereby enables high pressure hydraulic fluid through inlet 36 to be introduced above the intensifier 42. The high pressure acting on the large area on top of the intensifier 42 forces the intensifier 42 down. The pressure on the fluid below the intensifier 42 thus increases until it reaches a threshold determined by the area ratio between the top and bottom surfaces of the intensifier 42. Prior to reaching that threshold, the hydraulic fluid force exerted on the pilot fuel needle valve 46 is sufficient to overcome the downward force exerted by spring 50. The pilot fuel needle valve 46 lifts and pilot fuel from below the intensifier 42 is injected into the combustion chamber of the engine (not shown) through holes 34 in the lower tip of the gaseous fuel needle valve 47.

The upward travel of the pilot fuel needle valve 47 is limited by a mechanical stop 49 to avoid development of metal fatigue in the spring 50. As the intensifier 42 reaches its lower limit of downward travel, the pressure below the intensifier 42 drops as injection of pilot fuel into the combustion chamber continues. The pilot fuel injection pressure continues to drop until the pressure is too low to maintain the pilot fuel needle valve 46 in its upper position. The pilot fuel needle valve 46 under influence from spring 50 then drops to a closed position and the injection of pilot fuel is terminated. In this system, the source of high pressure hydraulic fluid in the cavity 48 surrounding the pilot needle valve 46 prevents combustion gases in the combustion chamber of the engine from entering the injector 31 through holes 34.

Intensifier 42 also serves as a hydraulic valve to actuate the gaseous fuel needle 47. As the intensifier 42 reaches its lowest position, the groove 55 around its circumference connects the hydraulic fluid in cavity 51 above spring 50 with the drain port 38 (see FIG. 15), thereby relieving the high pressure hydraulic fluid in cavity 51 above the gaseous fuel needle valve 47. The high pressure gaseous fuel in cavity 52 at the base of the gaseous fuel needle then raises the gaseous fuel needle 47, and permits the injection of the gaseous fuel into the combustion chamber of the engine through the series of gaseous fuel injection holes 33. The injection of gaseous fuel stops when the solenoid 32 is de-energized, which closes valve 40, thereby relieving the hydraulic fluid pressure above the intensifier 42. The vertical pressure differential across the intensifier 42 forces the intensifier upward, thereby closing the connection between the drain port 38 and the cavity 51. The hydraulic fluid pressure in the cavity 51 then rises to the common high pressure of the hydraulic fluid and the gaseous fuel needle 47 closes to a lower position. The intensifier 42 is forced upward until it reaches its upward travel stop. Once this cycle has been completed, the injector 31 is ready for the next injection.

Figure 17:
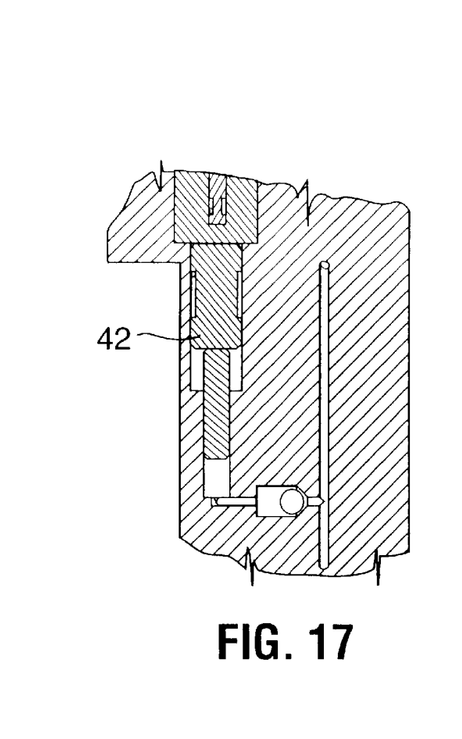
FIGS. 17, 18 and 19 show respectively detail, side and front section views of a fourth embodiment of single solenoid dual fuel injector taken along sections lines C—C, A—A, and B—B shown externally in FIGS. 12 and 13. This embodiment of injector uses high pressure hydraulic fluid to open the gaseous fuel valve, and an intensifier-plunger which acts as a normally closed valve.
Figure 18:
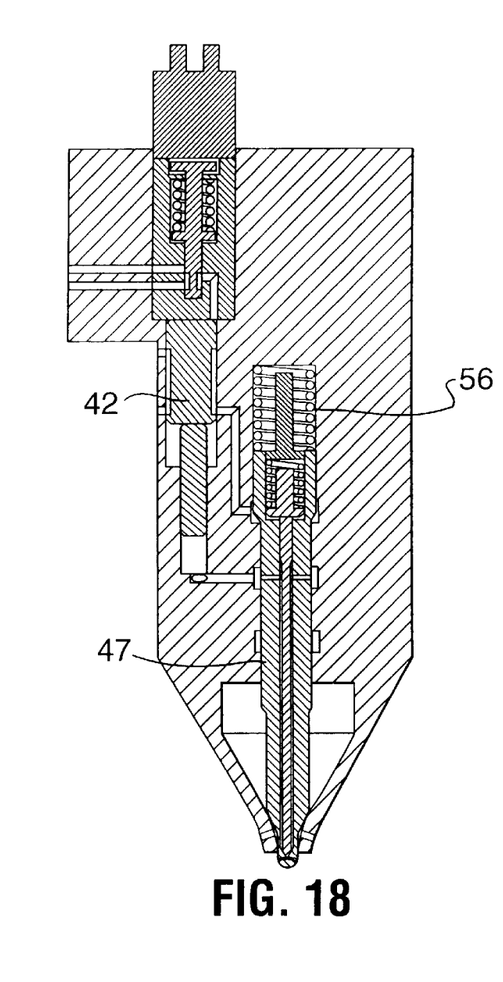
Figure 19:
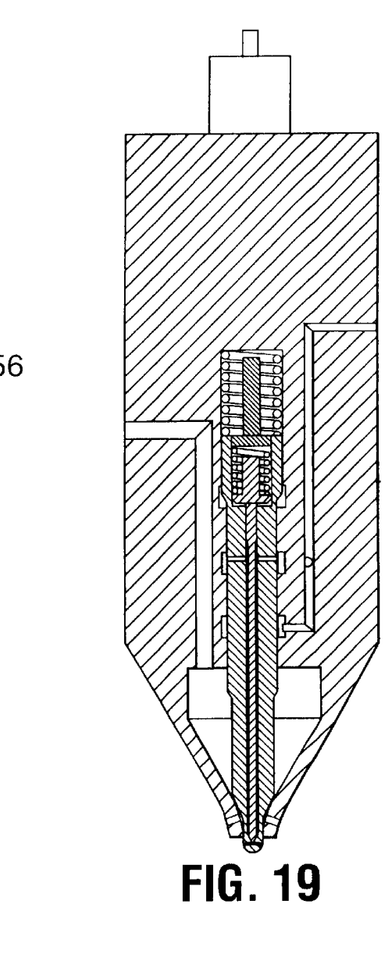

2(b) Single Solenoid Gaseous Fuel Valve and Pilot Fuel Valve Injector Using High Pressure Hydraulic Fluid to Actuate the Gaseous Fuel Needle Valve FIGS. 17, 18 and 19 show respectively detail, side and front section views of a second embodiment of single solenoid dual fuel injector taken along sections lines C—C, A—A, and B—B shown externally in FIGS. 12 and 13. This embodiment 2(b) of injector uses high pressure hydraulic fluid to open the gaseous fuel valve 47 and an intensifier-plunger 42 which acts as a normally opened valve. Embodiment 2(b), shown in FIGS. 17, 18 and 19 retains the same basic components as those presented in FIGS. 14 to 16, except actuation of the gaseous fuel needle valve 47 includes spring 56. Spring 56 is similar in operation to spring 28 which was described above in relation to the dual solenoid embodiment 1(b), and illustrated in FIGS. 9, 10 and 11. The gaseous fuel needle valve 47 is maintained in a downward closed position by coil spring 56. The downward force exerted by coil spring 56 is overcome when the upward force of hydraulic fluid and gas under gaseous needle valve 47 rises to the required level for opening gaseous fuel valve 47 and injection of gas into the combustion chamber.

The advantage of the single solenoid system disclosed and illustrated in FIGS. 12 to 19 is that only one solenoid 32 is used. The disadvantages are that the quantity of pilot fuel is fixed and the main gaseous fuel needle valve actuation occurs at a fixed time relative to the pilot fuel injection.

As will be apparent to those skilled on the art in the light of the foregoing disclosure, many alterations and modifications are possible in the practice of this invention without departing form the spirit or scope thereof. Accordingly, the scope of the invention is to be construed in accordance with the substance defined by the following claims.

What is claimed is:

1. A dual fuel injector for injecting a first fuel and a second, gaseous fuel into a combustion chamber comprising:
   (a) an injector body;
   (b) an inlet port in the injector body for enabling pressurized hydraulic fluid from a hydraulic fluid source to be introduced into the interior of the injector body, said hydraulic fluid being of a pressure slightly above that of the gaseous fuel pressure in order to maintain sealing and prevent leakage of combustion gas into the hydraulic fluid within the injector body;
   (c) a first inlet port in the injector body for enabling the first fuel to be introduced into the interior of the injector body;
   (d) a first injection valve in the injector body connected to the first inlet port for controlling injection of the first fuel from the injector through a first fuel ejection port, or ports, or orifices;
   (e) a second inlet port in the injector body for enabling the second fuel to be introduced into the interior of the injector body;
   (f) a second injection valve in the injector body connected to the second inlet port for controlling injection of the second fuel from the injector through a second fuel ejection port;
   (g) a first control valve which causes the hydraulic fluid to actuate the first injection valve;
   (h) a second control valve which causes the hydraulic fluid to actuate the second injection valve;
   (i) a metering device in the injector body for metering the amount of first fuel injected by the first injection valve;
   (j) an intensifier device in the injector body for increasing the pressure of the first fuel; and
   (k) a seal in the injector body which prevents leakage of the second fuel into the first fuel.

2. An injector as claimed in claim 1 wherein the first fuel is a pilot fuel.

3. An injector as claimed in claim 2 wherein the second fuel is a high pressure gaseous fuel.

4. An injector as claimed in claim 3 wherein the first injection valve is a needle valve.

5. An injector as claimed in claim 4 wherein the second injection valve is a needle valve.

6. An injector as claimed in claim 5 wherein the first needle valve controls injection of the pilot fuel and the second needle valve concentrically encloses the first needle valve and controls injection of the gaseous second fuel.

7. An injector as claimed in claim 6 wherein the second control valve is hydraulically operated.

8. An injector as claimed in claim 6 wherein a hydraulic fluid seal is located in a cavity between the second needle valve and the injector body.

9. An injector as claimed in claim 6 wherein the gaseous second fuel is ejected from ports located in the tip of the injector body, and the pilot first fuel is ejected through ports located in the tip of the second needle valve.

10. An injector as claimed in claim 6 wherein the positions of the first and second needle valves are biased by at least one spring.

11. An injector as claimed in claim 2 wherein the hydraulic fluid is the pilot fuel.

12. An injector as claimed in claim 1 wherein the hydraulic fluid is the first fuel.

13. An injector as claimed in claim 1 wherein the first control valve is electronically controlled and electrically operated.

14. An injector as claimed in claim 13 wherein the second control valve is electronically controlled and electrically operated.

15. An injector as claimed in claim 1 wherein the metering device is the intensifier device.

16. An injector as claimed in claim 15 including a solenoid which controls admission of hydraulic fluid to the intensifier, which intensifier controls admission of first fuel to the first fuel injection valve.

17. An injector as claimed in claim 15 including a first solenoid which controls admission of hydraulic fluid to the intensifier, which intensifier controls admission of first fuel to the first fuel injection valve, and a second solenoid which controls admission of the second fuel to the second fuel injection valve.

18. An injector as claimed in claim 11 including a one-way check valve which controls admission of hydraulic fluid from a hydraulic fluid inlet to the intensifier.

19. An injector as claimed in claim 15 wherein the intensifier acts as a two-way valve.

20. An injector as claimed in claim 15 wherein the intensifier acts as a three-way valve.

21. An injector as claimed in claim 1 wherein the seal is hydraulic fluid which is located between the first fuel and the second fuel.

22. An injector as claimed in claim 1 wherein the first injection valve is controlled by a first solenoid.

23. An injector as claimed in claim 22 wherein the second injection valve is controlled by a second solenoid.

24. An injector as claimed in claim 23 wherein the first valve controlled by the first solenoid has a spring which biases the first valve and the second valve controlled by the second solenoid has a spring which biases the second valve.

25. An injector as claimed in claim 14, wherein the valve controlled by the solenoid has a spring which biases the valve.

26. A fuel injector for injecting two fuels into an internal combustion engine comprising:
   (a) an injector body defining a fluid inlet port, a first fuel inlet port, a second fuel inlet port, a vent port, a first fuel outlet port and a second fuel outlet port;
   (b) a first fuel injection valve communicating with the fluid inlet port, the first fuel injection valve constructed to maintain a first position upon application of pressure from the fluid inlet port and to move responsive to venting of pressure through the vent port;
   (c) a selectively operable valve communicating with the fluid inlet port and the vent port to vent pressure applied to the first fuel injection valve;
   (d) a metering device communicating with the first fuel injection valve and constructed to supply first fuel through the first fuel outlet port;
   (e) a second fuel injection valve communicating with the second fuel inlet port, and the second fuel outlet port, the second fuel injection valve constructed to enable communication of fuel from the second fuel inlet port to the second fuel outlet port upon release of fluid pressure from the fluid inlet port and to terminate communication of second fuel from the second fuel inlet port through the second fuel injector valve upon application of pressure from the fluid inlet port; and
   (f) a seal preventing leakage of the first fuel into the second fuel.

* * * * *

UNITED STATES PATENT AND TRADEMARK OFFICE
CERTIFICATE OF CORRECTION

PATENT NO. : 6,073,862
DATED : June 13, 2000
INVENTOR(S) : Alain Michel Joseph Touchette, Bradley Donald Douville, Simon Michael Baker It is certified that error appears in the above-identified patent and that said Letters Patent is hereby corrected as shown below:

Title page,
References Cited, under U.S. PATENT DOCUMENTS, please add the following omitted citations:

| | | |
|---|---|---|
| -- 4,416,229 | 11/1983 | Wood |
| 4,543,930 | 10/1985 | Baker |
| 4,736,712 | 04/1988 | Savkar et al. |
| 4,742,801 | 05/1988 | Kelgard |
| 5,060,610 | 10/1991 | Paro |
| 5,067,467 | 11/1991 | Hill et al. |
| 5,199,398 | 04/1993 | Nylund |
| 5,315,973 | 05/1994 | Hill et al. -- |

References Cited, under FOREIGN PATENT DOCUMENTS, please add the following omitted citations:

| | | | | |
|---|---|---|---|---|
| -- EPO | 520 | 659 | 12/1992 | Oy Wartsila Diesel |
| EPO | 778 | 410 | 06/1997 | Wartsila Diesel |
| EPO | 787 | 900 | 08/1997 | Wartsila Diesel |
| EPO | 718 | 489 | 06/1996 | Wartsila Diesel -- |

References Cited, under Other Art, please add the following omitted citations:

Miyake, M., et al., "Recent Development of Gas Injection Diesel Engines", CIMAC Conf., Warsaw, 1987

Biwa, T., et al., "Development of the 28/32 Gas Injection Engine", MAN B & W

UNITED STATES PATENT AND TRADEMARK OFFICE
CERTIFICATE OF CORRECTION

PATENT NO. : 6,073,862
DATED : June 13, 2000
INVENTOR(S) : Alain Michel Joseph Touchette, Bradley Donald Douville, Simon Michael Baker It is certified that error appears in the above-identified patent and that said Letters Patent is hereby corrected as shown below:

References Cited, under Other Art cont'd.

Fukuda, T., et al., "Development of the Highly Efficient Gas Injection Diesel Engine with Glow Plug Ignition Assist for Cogeneration Systems", JSME-ASME International Conference in Power Engineering, ICOPE-93

Miyake, M., et al., "The development of high output, highly efficient gas burning diesel engines", 15th CIMAC Conference, 1983, Proceedings, vol. A2, pp. 1193-1216

Signed and Sealed this

Nineteenth Day of March, 2002

*Attest:*

JAMES E. ROGAN
*Director of the United States Patent and Trademark Office*

*Attesting Officer*